US006025041A

United States Patent [19]

Reuben

[11] Patent Number: 6,025,041

[45] Date of Patent: Feb. 15, 2000

[54] DOWN FEATHER SHEET

[75] Inventor: Ronnie Reuben, Montreal, Canada

[73] Assignee: Fabco Trading Corp., Montreal, Canada

[21] Appl. No.: 09/066,791

[22] Filed: Apr. 27, 1998

[51] Int. Cl.[7] ................................ A01N 1/00; A47G 9/00

[52] U.S. Cl. .................................. 428/15; 428/16; 5/502; 5/950

[58] Field of Search .......................... 5/502, 950; 428/16, 428/15

[56] References Cited

U.S. PATENT DOCUMENTS 2,959,793 11/1960 Bell et al. .................................. 5/334
2,960,702 11/1960 Linke et al. ................................ 5/334
3,405,674 10/1968 Coates et al. ........................... 112/420
4,134,167 1/1979 Kazuo .................................... 5/361 R
4,822,564 4/1989 Howard .................................... 422/52
5,408,700 4/1995 Reuben et al. ................................ 2/97
5,459,894 10/1995 Buonocore ................................. 5/737
5,692,245 12/1997 Reuben .................................... 2/243.1
5,799,600 9/1998 Reuben .................................. 112/420

*Primary Examiner*—Mark L. Bell
*Assistant Examiner*—Patricia L. Hailey
*Attorney, Agent, or Firm*—Swabey Ogilvy Renault; Guy J. Houle

[57] ABSTRACT

A method of fabricating a down feather sheet is described and it comprises forming a sheet of down feathers having been treated whereby to retain a homogeneous form. A binder is associated with the down feathers whereby they are retained together in sheet form. The down feather sheet product is also described.

11 Claims, 3 Drawing Sheets

DOWN FEATHER SHEET

TECHNICAL FIELD

The present invention relates to a down feather sheet or membrane as well as the method of fabricating same.

BACKGROUND ART

Down feather sheets are usually provided by forming a pouch, which may be of rectangular outline or patterned shape, by stitching together two fabric sheets and leaving an unseamed area wherein down feathers may be inserted within the pouch. The unseamed area is then sewn to trap the down feathers in the pouch. These feathers are then distributed within the pouch by shaking the pouch to displace the feathers substantially evenly therein. Cross-stitched lines are then formed across the fabric sheets whereby to trap the down feathers therebetween.

One of the major problems with this method of fabrication is that the down feathers are often unevenly distributed within the pouch due to the fact that in the manufacturing process the pouches are formed with fabrics which conceal the down feathers within the pouch and this often results in areas of the pouch not having enough down feathers and others having too many. Accordingly, the product does not have even insulating properties and its appearance is not suitable for use in fabricating a garment. Furthermore, by making many stitch lines across the fabric, cold spots are developed and the stitch lines where there is no insulation. The process is also very labor intensive and cannot be adapted to automatic fabrication. Another problem associated with down feathers is their uneven color. When these are inserted into a pouch formed by thin, light colored, fabrics, the down feathers within the pouch will give an uneven color appearance to the light colored fabric.

SUMMARY OF INVENTION

It is a feature of the present invention to provide a method of fabricating a down feather sheet or membrane which substantially overcomes the above-mentioned disadvantages of the prior art.

Another feature of the present invention is to provide a down feather sheet or membrane which is comprised of a substantially homogeneous distribution of down feathers which are retained together in a sheet form by a binder such as a chemical binding agent.

According to the above features, from a broad aspect, the present invention provides a method of fabricating a down feather sheet which comprises the step of forming a sheet of down feathers having been treated to retain a homogeneous form.

Another feature of the present invention is to provide a down feather sheet which comprises a substantially homogeneous distribution of down feathers retained together in sheet form by a binding means.

Another feature of the present invention is to provide a down feather sheet and a method of fabricating same wherein the binding means is a chemical binding agent which causes the feathers to adhere to one another.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
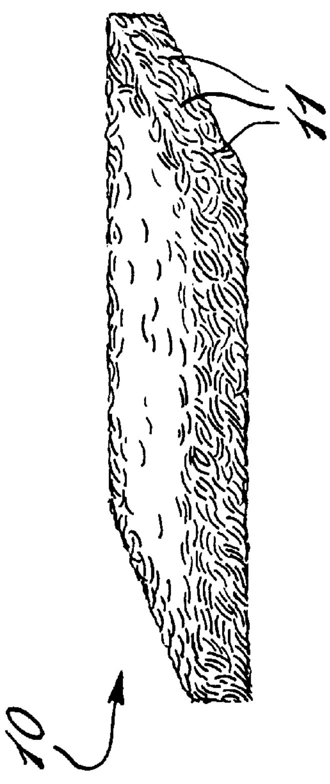
FIG. 1 is a perspective view of a down feather sheet constructed in accordance with the present invention.
Figure 5:
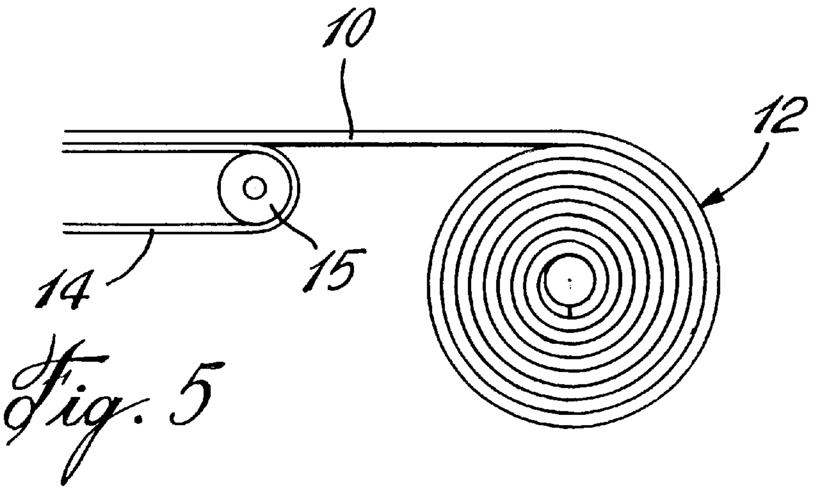
FIGS. 5 and 6 are schematic illustrations showing that the down feather sheet can be fabricated in roll form or in stacked sheet form.

Referring now to the drawings, and more particularly to FIG. 1, there is shown generally at 10 the down feather sheet of the present invention. It consists of a substantially homogeneous distribution of down feathers 11 retained together in sheet form by a binder means which will be described later. The down feather sheet 10 may be produced in roll form as illustrated at 12 in FIG. 5 or in sheet form, which may be stacked one on top of the other, as illustrated at 13 in FIG. 6.

Figure 2:
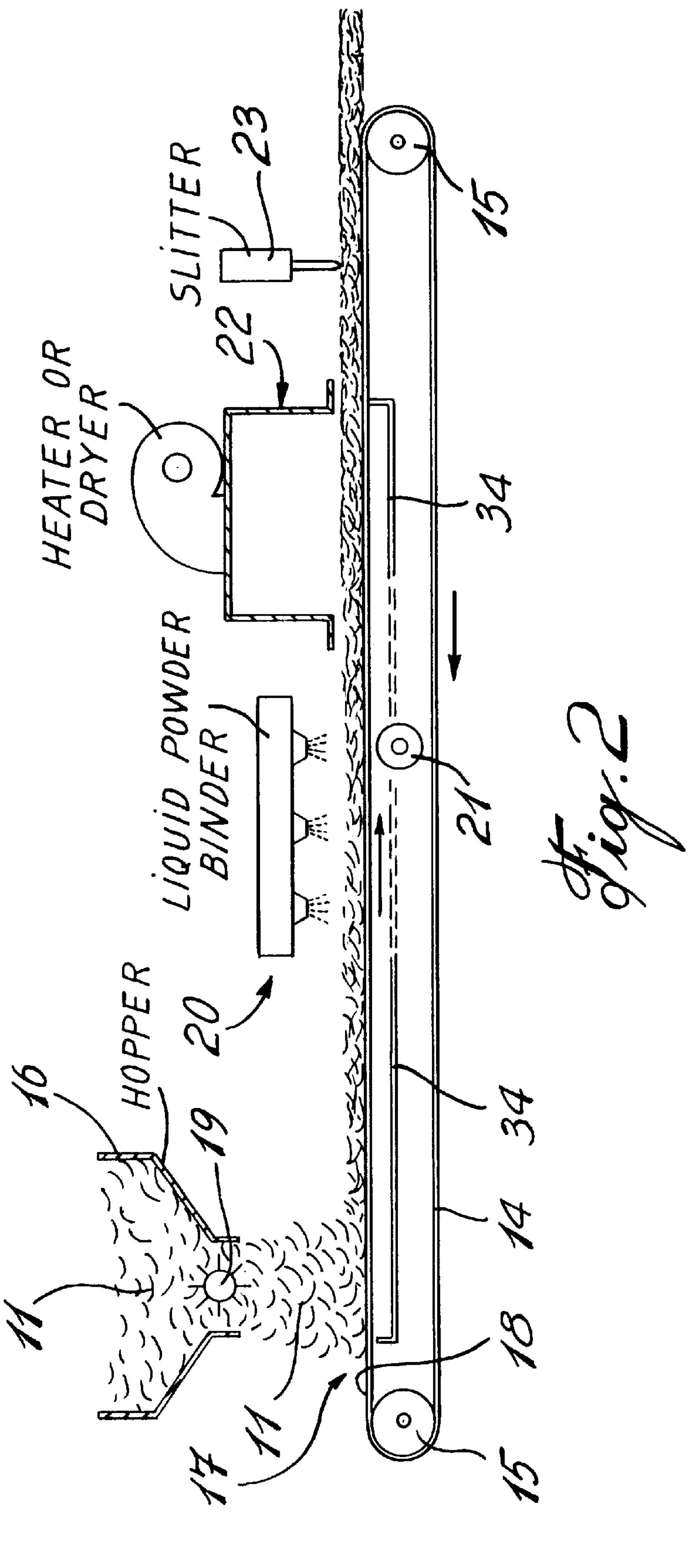
FIG. 2 is a schematic illustration showing a method of fabricating the down feather sheet using a liquid or powder binding agent.

Referring now to FIG. 2, there is shown one method of fabricating the down feather sheet 10 of the present invention. The method consists of providing a conveyor support surface, herein shown as an endless belt 14 supported between rollers 15. A supply of down feathers 11 is disposed within a hopper 16 at a feed end 17 of the conveyor and the feathers are deposited on the top surface 18 of the endless belt 14 at the feed end 17. The distribution of the feathers 11 is controlled by a rotor 19. A shroud, not shown, could be installed between the discharge end of the hopper 16 and the conveyor to shield the feathers against air currents, etc.

As can be seen a substantially even layer of down feathers 11 is disposed on the top surface 18 of the conveyor 14 and is displaced towards a binder applicating station 20 where a liquid or powder binder is applied to the down feathers. An agitator mechanism 21 may also be provided under the endless belt 14 at the binder application station whereby to cause the binder to mix thoroughly with the feathers.

Figure 6:
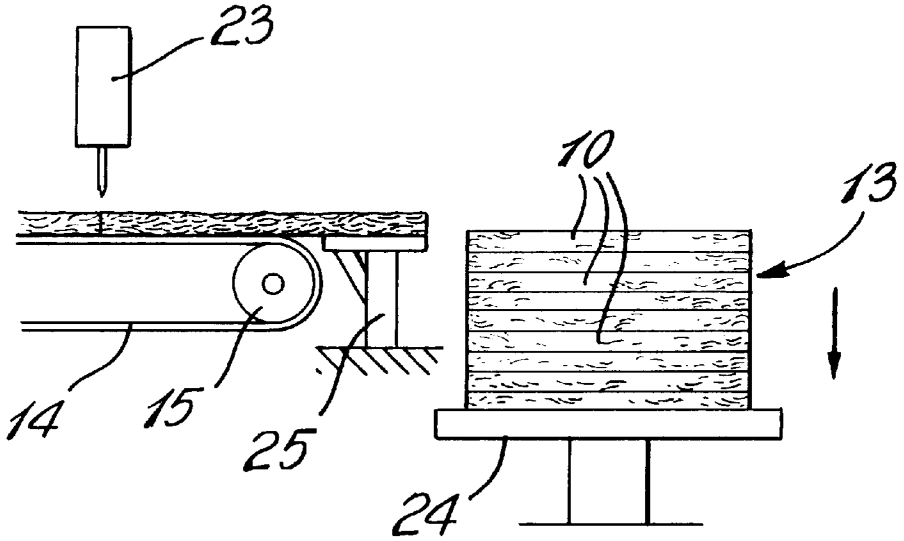

After the binder application station 20 the layer of down feathers is fed under a heater or dryer station 22 where the binding agent is caused to set whereby to bind the feathers together. At the outlet of the heater or dryer station 22, the sheet is of substantially homogeneous form and can then be slit by a slitter 23 whereby to produce down feather sheets, as illustrated in FIG. 6, which may be disposed on a support platform 24 to produce stacks of sheets 13 as shown in FIG. 6. A sheet transfer mechanism 25 disposes the sheets in stack form.

Figure 3:
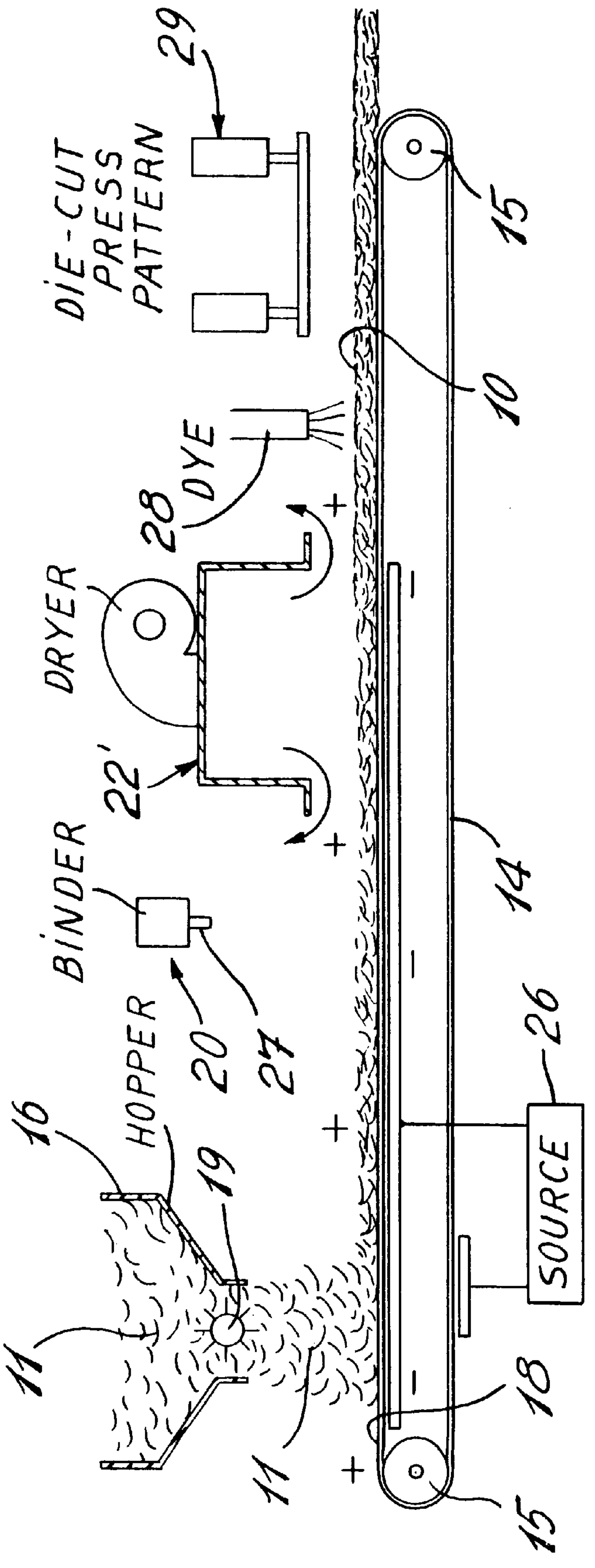
FIG. 3 is a schematic view similar to FIG. 2 but wherein the method comprises the fabrication of patterned down feather sheets and wherein the down feathers can be colored.
Figure 4:
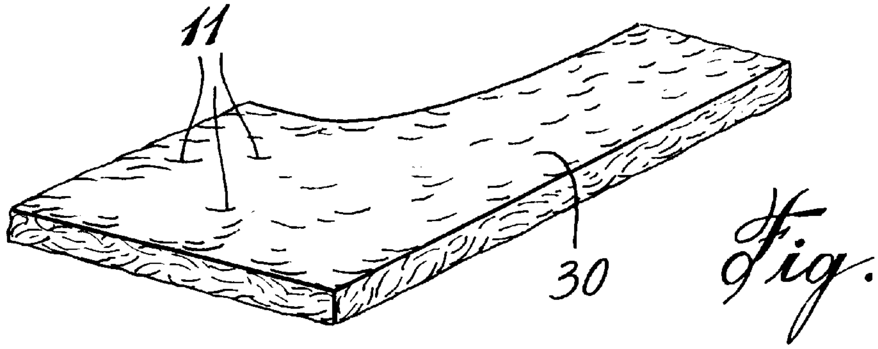
FIG. 4 is a perspective view showing a dye-cut pattern down feather sheet.

Referring now to FIG. 3, there is shown a further method of producing the down feather sheet 10 of the present invention. As hereinshown the down feathers are retained in even distribution on the conveyor belt 14 by an electrostatic field or charge which extends to at least the dryer station 22'. The electrostatic field is produced by a voltage source 26 which creates an electrostatic field between the top side and bottom side of the endless belt 14. As hereinshown the binder application station 20' is comprised of jet nozzles 27 which emit a spray of binder onto the down feathers. This binder is then dried at the dryer station 22'. A dye applicator 28 may also be provided if it is desirable to dye the down feather sheet 10 a certain color. The sheet may also be cut into a pattern by a dye-cut press 29 to produce the dye-cut down feather sheets 30 as illustrated in FIG. 4

The thickness of the feathers deposited on the belt may be regulated by the speed of displacement of the endless belt or else the speed of operation of the rotor 19 which dispenses down feathers from the hopper. The binding agent, when in powder form, may also be mixed with feathers in the hopper 16. Accordingly, it is not necessary to use the agitator 21.

It is within the ambit of the present invention to cover any obvious modifications of the examples of the preferred embodiment described herein. It is also readily apparent that with the process of manufacturing of the present invention down feather sheets of predetermined thickness and density may be produced by controlling the output of the hopper or the velocity of the endless belt and this can be done by automatic control means. Sensors may also be provided along the conveyor to detect the density and thickness of the down feather sheets. Further sensors may also be provided at the outlet end of the sheet to operate the slitter or the dye-cut press and to regulate the density of the coloration of the sheet should a dye be applied thereto. As previously described the binder may be a liquid powder or fibers added to the down feathers but it may also be provided in vapor spray or as a gas spray provided it has binding properties associated therewith. Although an automatic layering of the down feathers on the endless belt is described, this could also be done manually but to obtain a more even consistency in the distribution of the down, it is preferable that it be done by an automatic layering process. The entire process may also be performed in a regulated air pressure chamber or a vacuum could be provided under the endless belt to retain the down feathers evenly distributed on the top surface 18 of the conveyor belt 14. The vacuum would retain the feathers in place from the feed end of the conveyor to the dryer station. Such an optional vacuum system is illustrated in FIG. 1 and identified by reference numeral 34.

Another modification is to feed the down feather sheet 10 from the output of the conveyor between a pair of fabric sheets which can then be sewn together whereby to sandwich the down feather sheet between fabric sheets to form quilts or fabric to be later pattern cut for the production of articles of apparel. It is also pointed out that in the process herein described the down feather sheet remains reasonably subtle to the feel rather than rigid and the thermal property of the down is substantially preserved. The sheets also produced may be fragile or delicate and it is not essential that these be strong like a blanket. They merely need to be capable of packaging and onward shipment to some other facilities to accommodate further processing.

What is claimed is:

1. A down feather sheet comprising a substantially homogeneous distribution of down feathers directly bound together throughout by a chemical binding agent to form a sheet, said sheet being of substantially even thickness and density throughout, said sheet having totally exposed down feather surfaces.

2. A down feather sheet as claimed in claim 1 wherein said down feather sheet is formed of artificially colored down feathers.

3. A method of fabricating a down feather sheet comprising the steps of:

(i) automatically depositing and evenly distributing down feathers on a support surface in quantities to produce a sheet of down feathers having an even thickness, (ii) treating said down feathers with a chemical binding agent throughout whereby said down feathers will adhere to one another; and (iii) subjecting said sheet of down feathers to a temperature treatment to cause said down feathers to bind together to form a sheet of substantially evenly distributed feathers and wherein said sheet has exposed down feather surfaces.

4. A method as claimed in claim 3 wherein said support surface is constructed of material capable of maintaining an electrostatic charge, said method further comprising applying an electrostatic charge to said support surface to retain said down feathers by electrostatic charge.

5. A method as claimed in claim 3 wherein said chemical binding treatment is a liquid, gas, powder or vapor spray of a chemical having binding properties.

6. A method as claimed in claim 3 wherein said temperature treatment is performed within a (predetermined) temperature range to effect binding of said down feathers together.

7. A method as claimed in claim 3 wherein said sheet of down feathers is subjected to a drying process after having been treated with a chemical binder agent.

8. A method as claimed in claim 7 wherein said sheet of down feathers after being dried is subjected to a cutting process.

9. A method as claimed in claim 8 wherein said cutting process is a pattern cutting process for the production of articles of garments.

10. A method as claimed in claim 8 wherein said cut sheet is then packaged in sheet or roll form.

11. A method as claimed in claim 7 wherein said sheet of down feathers is subjected to an artificially dyeing process to produce an artificially colored down feather sheet.

* * * * *